United States Patent [19]

Munde

[11] Patent Number: 5,230,842
[45] Date of Patent: Jul. 27, 1993

[54] INTERIOR PIPELINE COATING PROCESS

[76] Inventor: Bruce A. Munde, 8826 Lakemont, Dallas, Tex. 75209

[21] Appl. No.: 771,786

[22] Filed: Oct. 4, 1991

Related U.S. Application Data

[63] Continuation of Ser. No. 312,876, Feb. 21, 1989, abandoned.

[51] Int. Cl.⁵ .................. B29C 47/00; B32B 35/00; F16L 55/18; F16L 58/00
[52] U.S. Cl. .................. 264/34; 118/408; 118/DIG. 10; 138/97; 138/98; 264/35; 264/36; 264/37; 264/40.1; 264/255; 264/265; 264/269; 264/312; 405/155; 405/156; 405/157; 427/230; 427/238; 427/239
[58] Field of Search .......... 118/408, DIG. 10; 425/262, 427; 427/230, 239, 238; 138/97, 98, 89; 264/31-35, 254, 255, 36, 265, 269, 40.1, 310, 312, 37; 405/150, 154-157, DIG. 10

[56] References Cited

U.S. PATENT DOCUMENTS

| | | | |
|---|---|---|---|
| 2,808,852 | 10/1957 | Brant | 118/408 X |
| 2,908,248 | 10/1959 | Brant | 118/408 |
| 3,108,012 | 10/1963 | Curtis | 117/95 |
| 3,125,464 | 3/1964 | Harmes | 118/408 X |
| 3,307,996 | 3/1967 | Keneipp, Jr. | 156/287 |
| 3,334,389 | 8/1967 | Matheny | 452/262 |
| 3,394,025 | 7/1968 | McCune | 118/408 X |
| 3,556,831 | 1/1971 | Schinabeck | 117/2 |
| 3,655,122 | 4/1972 | Brown et al. | 239/226 |
| 3,753,766 | 8/1973 | Brown et al. | 117/97 |
| 3,920,363 | 11/1975 | Nelson Holland | 425/262 X |
| 3,960,644 | 6/1976 | McFadden | 156/390 |
| 4,178,875 | 12/1979 | Moschetti | 118/712 |
| 4,216,738 | 8/1980 | Muta | 118/72 |
| 4,318,835 | 3/1982 | Clarke | 264/36 |
| 4,327,132 | 4/1982 | Shinno | 427/235 |
| 4,425,385 | 1/1984 | Coulter et al. | 427/239 X |
| 4,439,469 | 3/1984 | Wood | 427/230 |
| 4,455,329 | 6/1984 | Snow | 427/239 X |
| 4,526,813 | 7/1985 | Wu | 427/235 |
| 4,556,580 | 12/1985 | Kamuro et al. | 427/8 |
| 4,609,686 | 9/1986 | Giordano, Jr. et al. | 525/488 X |
| 4,741,795 | 5/1988 | Grace et al. | 425/262 X |
| 4,798,474 | 1/1989 | Daily | 118/408 |

FOREIGN PATENT DOCUMENTS

| | | | |
|---|---|---|---|
| 159494 | 9/1984 | Japan | 264/36 |
| 1087885 | 5/1986 | Japan | 427/239 |
| 1155973 | 6/1989 | Japan | 427/239 |

OTHER PUBLICATIONS

Instituform Brochure–Insituform Mid–America, Inc.–16 pages.
Sanjet Brochure–Ucisco–7 pages.
Internal Pipeline Corrosion Controlled with in Situ Coating Service Brochure–3 pages.
Replace Plant Pipes without Digging Brochure–Mid America, Inc. 4 pages.
Driscopipe 9100 Brochure–20 pages.–Phillips Driscopipe Co.

*Primary Examiner*—Karen Aftergut
*Attorney, Agent, or Firm*—Pravel, Hewitt, Kimball & Krieger

[57] ABSTRACT

To rehabilitate an internally corroded underground pipeline, excavations are made at its opposite ends to which launching and receiving pipe structures are then secured. Various pig member sets, with appropriate treatment fluids carried thereby, are air-driven through the entire length of the pipeline to successively acid clean, etch, and neutralize its interior surface. The interior pipeline surface is then thoroughly dried by flowing dehydrated air through the pipeline. Specially designed leading and trailing extruder pigs, with 100% solid, high viscosity, solvent-free epoxy coating material therebetween, are then air-driven through the pipeline to extrude a first protective coating layer onto its interior surface. The first layer is then dried with dehydrated air. Additional layers are then extruder pig-applied, and similarly dried, to form a relatively thick interior pipeline coating that protects the pipeline against further interior corrosion and also forms, in effect, a "pipe within a pipe" that provides the now rehabilitated pipeline with substantial structural reinforcement from within.

14 Claims, 3 Drawing Sheets

INTERIOR PIPELINE COATING PROCESS

CROSS REFERENCE TO OTHER APPLICATIONS

This is a continuation of my previous co-pending U.S. patent application Ser. No. 07/312,876 having a filing date of Feb. 21, 1989, for which benefit is claimed under 35 U.S.C. § 120 now abandoned.

BACKGROUND OF THE INVENTION

The present invention relates generally to apparatus and methods for coating the interior surface of a pipeline and, in a preferred embodiment thereof, more particularly provides methods and associated apparatus for the in situ interior application, in extended, deteriorated underground pipelines, of a multi-layer protective and rehabilitative coating. The coating may be formed in a total thickness sufficient to not only seal leaks in the pipeline and inhibit further interior corrosion thereof, but to provide a very substantial amount of structural reinforcement to the deteriorated pipeline as well. Importantly, absent large holes or breakages in the pipeline, the interior coating technique of the present invention may be employed without excavation except at the opposite ends of the pipeline.

As is well known, several miles of corroded underground metal pipeline typically present a near monumental problem to the pipeline owner or operator. Total replacement of the pipeline is very often out of the question from both economic and downtime standpoints. A logical alternative is to laboriously locate the most seriously deteriorated sections of the pipeline, excavate at their locations, and patch them or replace them with new pipe. This "patchwork" solution, as might be imagined, presents an ongoing project which merely defers portions of the necessary repair/replacement cost and, at best, is far from satisfactory. After the worst pipe sections have been repaired or replaced it is often only a short time before the second worst sections begin to leak.

Thus, for many years, an in situ method of internal pipeline repair has been rather eagerly sought, and various proposals have been made as to how best to avoid total or "patchwork" replacement of deteriorated underground pipelines by repairing them from the inside along their entire in-place lengths.

One in situ method proposed entails the cable-pulling of a flexible polyethelene liner pipe into and through the deteriorated metal pipeline to form therein a continuous corrosion barrier, the pulled-in liner pipe being compressively "set" to the interior surface of the metal pipeline. To carry out this pipe lining process it is necessary to excavate at spaced intervals along the buried metal pipeline and remove sections thereof at the various excavation locations. Special reconnection flanges must then be secured to each pair of facing pipeline ends. With the now sectioned pipeline prepared for liner installation, appropriate lengths of the liner pipe are cablepulled and set into place within their associated pipeline sections. The liner pipe sections must then be joined, the pipeline sections reconnected, and the excavation holes refilled. Particularly where the deteriorated pipeline extends for several miles, this is a rather costly and time-consuming process which can result in extended pipeline downtime.

For example, as a practical matter the maximum installation length of each pipe liner section is from about 2,500 feet to about 5,000 feet. Thus, in a twenty mile underground pipe line approximately twenty to forty separate excavations must be made, with generally the same number of separate pipeline cuts, liner pulls, pipeline rejoining steps and excavation refills being required.

Another conventional in situ pipeline repair technique entails the longitudinal pulling through each previously cut apart section of the pipeline a length of reversible pipe lining material having, on its resulting outer side surface, an adhesive material which bonds the flexible liner section to the interior surface of its pipeline section. Like the liner pipe method described above, this method requires considerable excavation, pipeline cutting and reconnection, pipeline downtime, and considerable expense.

As an alternative to these liner pipe and eversible flexible liner techniques, various internal pipeline coating methods have been proposed. For example, self-propelled or cable-pulled spray coating machines of various types have been used to internally coat pipelines with a corrosion inhibiting substance. These methods, like their liner counterparts, involve considerable excavation and the cutting of the corroded pipeline into a series of end-to-end sections whose lengths are limited by the maximum usable cable length. Additionally, of course, the pipeline sections must be suitably rejoined, and the various excavations refilled.

Finally, as described in U.S. Pat. No. 3,108,012 to Curtis, an in situ interior coating process for deteriorated underground pipelines has been proposed in which spaced apart pipeline "pigs" are air driven through various sections of the pipeline to perform cleaning and protective coating operations therein. During the cleaning phase of the operation, a suitable cleaning agent is disposed between the pigs, and during the coating operation a solvent-based coating liquid, akin to a "paint", is disposed therebetween.

While the Curtis method is considerably simpler than the solid lining and spray coating techniques, it has a variety of problems, limitations and disadvantages. For example, the liquid, solvent-based coating material may only be applied in a relatively thin layer, on the order of 0.005" to about 0.006", if satisfactory drying (i.e., solvent removal) is to be achieved. If a thicker layer is applied, incomplete drying occurs which often results in portions of the coating being washed away when the pipeline is returned to service.

Maintenance of this maximum coating thickness is rendered nearly impossible due to the propensity of the solventbased coating to "run" prior to the drying thereof. This tends to cause the coating to "puddle" on the bottom of the pipeline, and to drip into the corrosion pits therein (which may often be 0.200" deep). Thus, the coating on the upper interior pipeline is often thinner than desired and the coating thickness on the bottom of the pipeline can be far greater than that which can be satisfactorily dried and cured. Accordingly, when the pipeline is returned to service, large areas of uncured coating are often simply washed away—particularly from the corrosion pits in the of the pipeline. This now exposed pitted area is then subjected to a concentrated corrosive action of the fluid traversing the pipeline when it is returned to service.

Moreover, the Curtis process is basically an interior pipe "painting" scheme. The resulting thin coating on the pipe interior does not add any appreciable measure of structural reinforcement (often sorely needed) to the corroded pipeline.

In view of the foregoing, it is accordingly an object of the present invention to provide methods and associated apparatus for the in situ interior protective coating of extended pipelines which eliminates or substantially minimizes the above-mentioned and other problems, limitations and disadvantages typically associated with conventional techniques for providing corrosion repair and rehabilitation for deteriorated pipelines.

SUMMARY OF THE INVENTION

In carrying out principles of the present invention, in accordance with a preferred embodiment thereof, improved methods and associated apparatus are provided for protectively rehabilitating an extended, internally corroded underground pipeline. Excavations are made at the opposite ends of the pipeline and specially designed launching and receiving pipe structures are secured to the exposed pipeline ends. Air-driven pig sets, with various treatment fluids carried thereby, are successively forced completely through the pipeline to perform successive pre-coating initial acidizing, acid etching and neutralizing steps.

In carrying out the initial acidizing and acid etching steps, pairs of uniquely configured bi-directional brush pigs are used, each of which is of a longitudinally compact configuration defined by a pair of urethane pigging disc members secured to opposite ends of a retaining bolt member. Centrally secured to the bolt is a disc-shaped wire brush member. The compact configuration of each brush pig member permits it to be driven around even relatively sharp pipeline bends, while its brush configuration permits the pig to be driven back and forth through the pipeline without the necessity of removing the pig and reversing its orientation within the pipeline.

According to a feature of the present invention, the launching and receiving pipe structures are provided with valve and bumper means which are operative to permit a first pig set to be air-driven through the pipe line while a second set of pigs is being loaded thereinto. The bumper portions of such means are also operative to engage a pig at the end of its pipeline traversal and prevent it from being forced into the receiving chamber portion of the pipe structure, thereby permitting a particular pig set to be forced back and forth through the pipeline without removing the pig set.

To protectively coat the cleaned, etched and neutralized interior pipeline surface, a 100% solid, high viscosity, solvent-free epoxy coating material is provided, and a predetermined quantity of the coating material is placed between two cup and multi-disc extruder pigs which are driven by dehydrated air through the pipeline. As the extruder pigs traverse the pipeline the coating material is forced outwardly around the cup portion of the trailing extruder pig to efficiently fill corrosion pits on the interior pipeline surface, and to form a first protective coating layer thereon. The discs on the trailing extruder pig have circumferentially offset series of radial slots formed therein which function to impart a thorough mixing action to the coating material prior to its being forced outwardly past the cup portion of the extruder pig.

After the first coating layer has been applied in this manner, it is cured by flowing dehydrated air through the pipeline. Preferably at least two additional coating layers are then applied in this manner, with dehydrated air drying between each additional layer application, to form on the interior pipeline surface a multi-layer coating which not only protects the pipeline from further internal corrosion, but is sufficiently thick to form, in effect, a "pipe within a pipe" that provides significant structural reinforcement to the now rehabilitated pipeline.

The coating material is advantageously provided, via a suitable cure-inhibiting agent contained therein, with an extended pot life on the order of approximately 4-6 hours which permits each protective coating layer to be applied in a single "pass" of the extruder pigs through the pipeline—even when the pipeline has a length of over twenty miles.

Because the coating material is solvent free, a total coating thickness of well over 100 mils may be achieved with only a few coating layers being applied. Also due to the absence of solvent in the coating material, curing problems, such as incomplete "setting" of the material, running and dripping, and inordinate thickness variations from the top to bottom sides of the pipeline, are essentially eliminated.

In summary, the pipeline coating process of the present invention advantageously provides a highly efficient, relatively rapid and inexpensive alternative to previous pipeline coating and rehabilitation techniques provided in the prior art.

DETAILED DESCRIPTION

Figure 1:
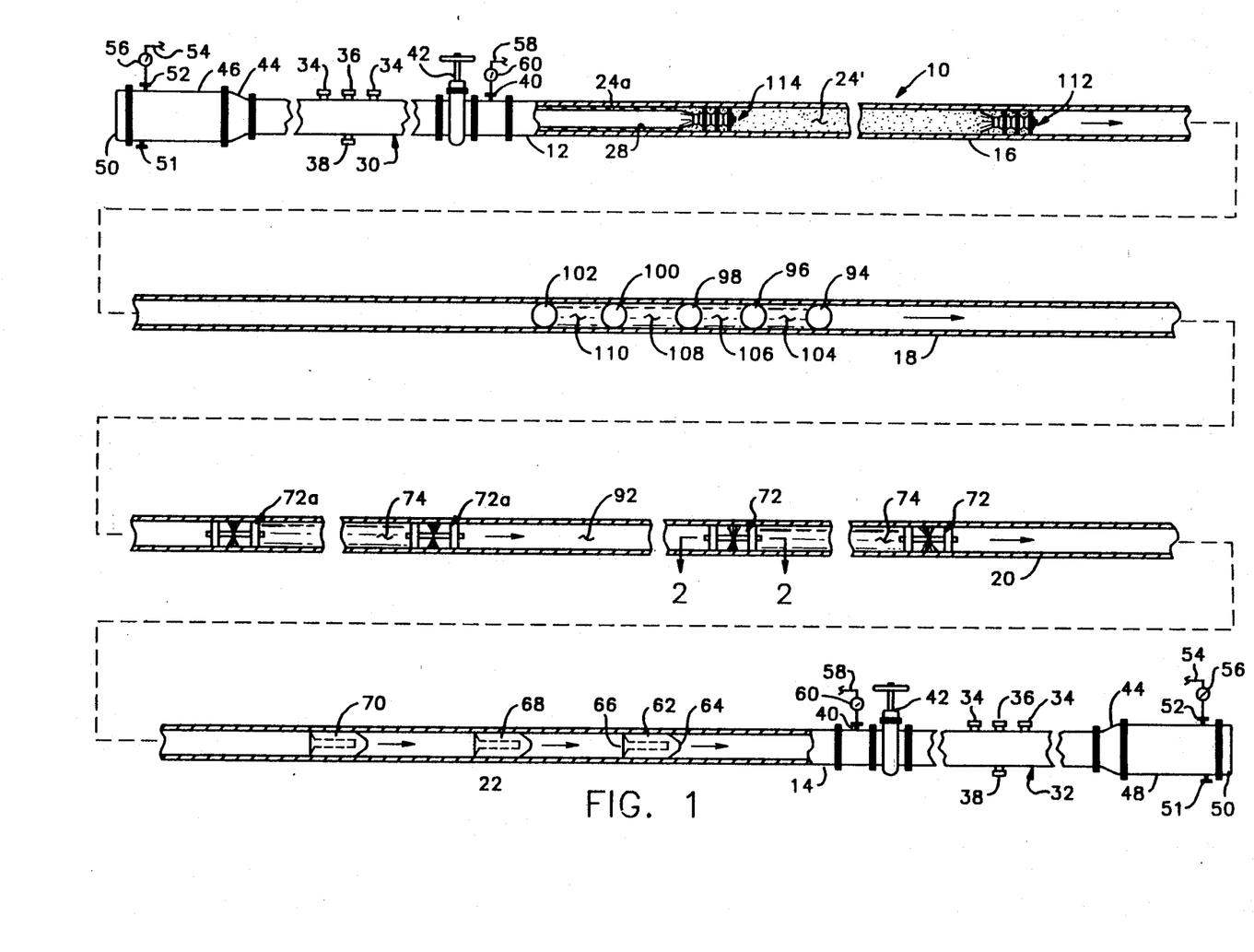
FIG. 1 is a schematic, longitudinally foreshortened cross-sectional view, partially in elevation, of a corrosively deteriorated underground pipeline within which an in situ interior coating process of the present invention is being performed.

Schematically illustrated in FIG. 1, in longitudinally foreshortened form, is a corrosively deteriorated underground pipeline 10 having, for illustrative purposes, a ten mile length extending between its inlet end 12 and it outlet end 14. From top to bottom in FIG. 1, representative longitudinal sections 16, 18, 20 and 22 of the pipeline are shown.

Figure 7:
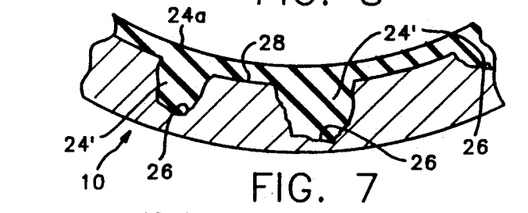
FIG. 7 is an enlarged scale cross-sectional view through a small bottom side portion of the pipeline after a first layer of protective coating has been applied thereto.
Figure 8:
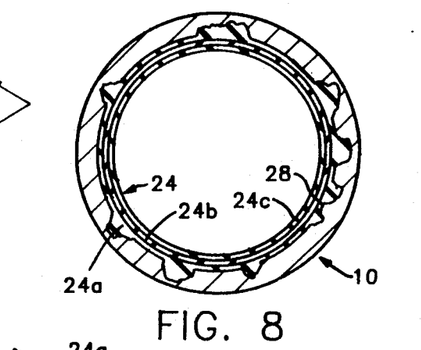
FIG. 8 is an enlarged scale cross-sectional view through the pipeline after the coating portion of the process has been completed.

The present invention provides a unique in situ method, and associated apparatus, for relatively quickly and inexpensively appling a multi-layer protective coating 24 (FIG. 8) to the interior surface of the pipeline 10, along its entire extended length without, in most instances, excavation of the pipeline except adjacent its opposite ends 12 and 14. Importantly, the protective coating may easily be applied in a total thickness such that, when hardened, it forms a "pipe within a pipe" that provides substantial structural reinforcement to the interiorly rehabilitated pipeline 10. Additionally, as will be seen, the structurally reinforcing coating 24 fills and seals the various corrosive pits 26 (FIG. 7) which are particularly prevalent on the lower side of interior surface 28 of the pipeline.

In preparing the pipeline 10 for the interior coating process of the present invention, suitable excavations are made adjacent the inlet and outlet ends 12, 14 of the pipeline. Elongated loading/receiving pipes 30 and 32, of the same interior diameter as the pipe 10, are respectively secured to the pipeline inlet and outlet ends 12 and 14. For purposes later described, each of the loading/receiving pipes 30, 32 is provided with a pair of fluid inlet ports 34, a vent fitting 36, a drain fitting 38, an air inlet fitting 40 adjacent the inner end of the loading/receiving pipe, and a full-opening gate valve 42 positioned between the air inlet fitting 40 and the fluid inlet, vent and drain fitting.

Respectively secured to the outer ends of the pipe sections 30 and 32, by means of flanged pipe transition sections 44, are launching and receiving chamber members 46 and 48 formed from larger diameter pipe sections provided at their outer ends with suitable quick-opening closure members 50. Secured to the launching chamber members 46, 48 adjacent their outer ends are drain fittings 51 and air inlet fittings 52 to which suitable pressurized air supply conduits 54 are connected, the conduits 54 being provided with suitable air pressure gauges 56. In a similar fashion, pressurized air supply conduits 58, having air pressure gauges 60 therein, are connected to the air inlet fittings 40.

With these auxiliary pipe connections made to the opposite ends 12, 14 of the pipeline 10, a cleaning phase of the internal pipe coating process is initiated by loading, in a conventional manner, a first foam wiper pig 62 into the piping section 30 through the launching chamber member 46. The foam wiper pig 62 is of a conventional solid cord urethane construction having a somewhat bullet-shaped configuration with a tapered front end 64, and a concave rear end 66. This first foam wiper pig 62 is of a relatively "soft" urethane material and, after its loading into the pipe section 30, is air-driven through the pipeline 10 by means of pressurized air forced into the launching chamber member 46 via the air supply conduit 54 and the inlet fitting 52. The wiper pig 62 is used to generally determine the condition, from a corrosion and blockage standpoint, of the interior of the pipeline 10. As it traverses the pipeline 10, the pig 62 scrapes away surface scale which has built up within the pipeline. If the pig 62 encounters and is stopped by a scale buildup within the pipeline, as would be indicated by a significant pressure rise on the gauge 56 of the launching chamber member 46, the air supply pressure is simply increased to either force the pig 62 past the scale obstruction, or to explode the pig and thereby break the obstruction loose.

One or more of the relatively "soft" first pigs 62 are air-driven through the pipeline into the receiving chamber member 48 until it is determined that the pipeline interior has been rendered substantially free of major scale obstructions. Second and third progressively harder foam wiper pigs 68 and 70 are then successively air-driven through the pipeline to remove a large portion of the built-up scale therein, and to wipe away process fluid (previously drained from within the pipeline) still adhering to its inner surface. It will readily be appreciated that a greater or fewer number of these foam wiper pigs may be used depending upon the condition of the pipeline.

The next pipeline preparation step entails the loading of a spaced pair of specially designed bi-directional brush pigs 72 into the loading/receiving pipe 30 in a spaced relationship, upstream and downstream from the fluid inlet ports 34, and then utilizing one of the inlet ports 34 to flow a predetermined quantity of acidizing fluid 74 into the pipeline space between the two brush pigs 72. The acidizing fluid 74 is preferably a mixture of hydrochloric acid and water with a suitable inhibitor medium added thereto to inhibit acid attack on the steel interior surface of the pipeline beneath the residual scale thereon. With the acidizing fluid 74 positioned between the brush pigs 72, the pigs 72 are air-driven through the pipeline 10 using pressurized air delivered to the launching chamber 46 via the inlet conduit 54 thereon. To accurately control the velocity of the fluid separated brush pigs 72 through the pipeline 10, pressurized air is also delivered to the interior of the receiving chamber 48, via its air supply conduit 54, at a somewhat lower downstream pressure.

Accordingly, by maintaining a predetermined air pressure differential across the brush pigs 72, their velocity through the pipeline 10 may be accurately controlled to in turn control the amount of time that a given interior surface section of the pipeline 10 is exposed to the acidizing fluid 74 which attacks and loosens interior surface scale thereon. In operation, the brush element on the leading pig 72 scrapes and loosens scale ahead of the acidizing fluid 74, and the brush element on the trailing pig 72 similarly scrapes the scale after it has been attacked by the acidizing fluid.

Figure 2:
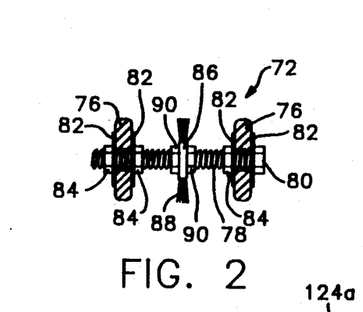
FIG. 2 is an enlarged scale cross-sectional view, taken along line 2—2 of FIG. 1, through a specially designed biadirectional brush pig used in a pipe cleaning step of the process.

Referring now to FIG. 2, each of the bi-directional brush pigs 72 comprises a pair of annular, generally disc-shaped urethane pig elements 76 coaxially mounted in a spaced relationship on a connecting bolt member 78 having a head portion 80. Each of the pig elements 76 is retained in place on the bolt 78 by washer and nut members 82 and 84 as illustrated. The annular central body 86 of an annular brush element 88 is coaxially and centrally retained on the bolt 78 by a pair of nuts 90.

The compact configuration of the brush pigs 72, and the use thereon on the annular brush elements 88, permits them to be air-driven in either direction through the pipeline 10 without reversing their orientation therein, and further permits them to be air-driven around even very sharp bends in the pipeline.

Referring again to FIG. 1, after the first fluid separated pair of brush pigs 72 is air-driven a suitable distance down the pipeline 10, pressurized air delivery to the end chambers 46 and 48 is terminated, and a second pair of fluid separated bi-directional brush pigs $72_a$ is loaded into the pipe section 30, in a unique manner subsequently described, and pressurized air is again flowed into the chambers 46 and 48 to drive the two pairs of brush pigs 72 and $72_a$, which are separated in the pipeline by a considerable quantity of compressed air 92, to the pipe section 32. In a manner subsequently described, a unique bumper stop system utilized in the chamber 48 (as well as in the chamber 46) prevents the lead pig 72 from entering the chamber 48 and holds it generally at the outer end of the pipe section 32.

With the pig pairs 72, 72$_a$ stopped in this manner, the drain fitting 38 on the pipe section 32 is utilized to draw a small sample of the acidizing fluid 74 outwardly from between the pigs 72 to test its condition. If the fluid 74 is suitable for further use, the pig pairs 72 and 72$_a$ are simply air-driven in a reverse direction through the pipeline to the pipe section 30 by forcing pressurized air into the chambers 46 and 48, with the pressure to the right of the pig pairs being higher than the pressure to their left.

This reversal of the pig sets 72, 72$_a$ is continued until it is determined that the interior surface of the pipeline is sufficiently clean. It is to be noted that in conventional brush pig cleaning techniques, it is typically necessary to run one pig pair completely through the pipeline prior to loading another pig pair therein. Additionally, under conventional practice, the first pig pair would be blown into the end chamber 48 so that the acidizing fluid between the pigs would have to be discarded or reloaded between a pig pair. Moreover, the pigs received in the chamber 48 would have to be reloaded in a reversed orientation to be driven in a reverse direction through the pipeline toward the end of chamber 46. Alternatively, under conventional practice, after the first pig pair enters the end chamber 48, and have been removed therefrom, the second pig pair would be launched from the inlet end of the pipeline. It can be seen that the ability provided by the present invention to load and simultaneously drive more than one pair of brush pigs through the pipeline results in considerable time savings. Further time saving is achieved by the bi-directional construction of the brush pigs which permits them to be driven in opposite directions through the pipeline without first unloading and reversing them.

After this initial acidizing and scale removing step is performed utilizing the bi-directional brush pigs 72 and 72$_a$, a chemical etching step is performed, using the brush pigs 72, 72$_a$ in the same manner with a stronger acid solution positioned between the pigs in each pair thereof. The use of a stronger acid solution between the pigs etches the now essentially scale free metal interior of the pipeline to provide an "anchor" pattern on the interior pipeline surface to prepare it for the application thereto of a liner/sealer material in a manner subsequently described.

The final step in preparing the interior pipeline surface for the application of a protective coating thereon entails the "neutralizing" of the pipeline interior surface. This neutralizing step is performed using, from right to left in FIG. 1, five conventional urethane pigging spheres 94, 96, 98, 100 and 102. These five pigging spheres are loaded in a conventional manner into the pipe section 30, in the illustrated "train" configuration, with water 104 placed between the spheres 94 and 96, an aqueous ammonia solution 106 placed between the spheres 96 and 98, water 108 placed between these spheres 98 and 100, and a methyl alcohol solution 110 placed between the spheres 100 and 102. A suitable drying additive, such as Actron #830 as manufactured by the Reaction Chemical Company of Odessa, Tex., is mixed with the methyl alcohol solution 110.

The illustrated train of spherical pig members is driven rightwardly through the pipeline 10 at a controlled rate utilizing dehydrated air differentially supplied to the chambers 46 and 48. Contact of the interior pipeline surface by the sequentially disposed fluids 104, 106, 108 and 110 functions to neutralize the acid-etched interior surface of the pipeline. The use of dehydrated air as the pig train-driving mechanism functions to prevent "flash rusting" of the now cleaned interior pipeline surface.

After the interior pipeline surface has been prepared in this manner, it is thoroughly dried by flushing the pipeline with dehydrated air. Additionally, conventional de-watering pigs (not shown) may be forced through the neutralized pipeline using dehydrated air.

Referring now to FIGS. 1, 3, 5, and 6, after the pipe interior surface has been de-scaled, cleaned, etched, and dried as described above, the multi-layer protective coating 24 (FIG. 8) is applied to the interior pipeline surface by means of specially designed leading and trailing extruder pigs 112 and 114. The leading extruder pig 112 comprises, from left to right, four urethane elements—an upstream or rear end cup member 116 having a cylindrical base portion 118, a pair of intermediate disc members 120 and 122, and a downstream or front end disc member 124, each of the three disc members having central hub portions 126 on their opposite sides. For purposes later described, the discs 120 and 122 having a series of radial slots 128 formed in their peripheries, and the cup member 116 has a plurality of rightwardly and radially outwardly sloped passages 130 formed therethrough which extend from an upstream cup member depression 132 bounded by a generally cylindrical wall portion 134 of the cup member. The four urethane elements 116, 122, 124 and 126 are coaxially secured in an abutting relationship by a suitable bolt member 136 extended through central openings formed in such elements, the bolt 136 being provided at its right end 138 with a retaining nut 140.

Figure 3:
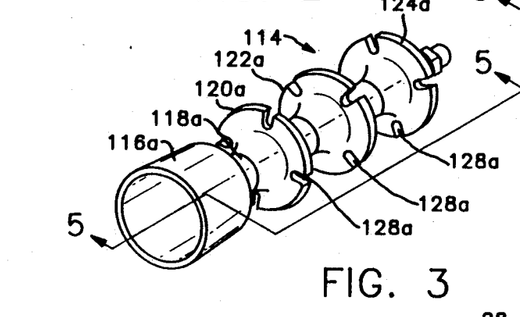
FIGS. 3 and 4, respectively, are enlarged scale perspective views of specially designed trailing and leading extruder pigs used in the coating portion of the process.
Figure 4:
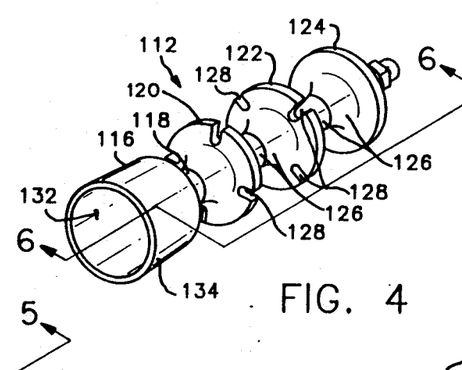

The trailing extruder pig 114 is similar in construction to the leading pig 112, and comprises an upstream or rear end cup member 116$_a$ having a base portion 118$_a$, a pair of intermediate disc members 120$_a$ and 122$_a$, and a downstream or front end disc member 124$_a$, the extruder pig elements 116$_a$, 120$_a$, 122$_a$ and 124$_a$ being coaxially connected in an abutting manner by a central bolt 136$_a$ onto which a retaining nut 140$_a$ is threaded. For purposes later described, circumferentially spaced series of radial slots 128$_a$ are formed in the peripheries of each of the three discs 120$_a$, 122$_a$ and 124$_a$, with the slots 128$_a$ in disc 122$_a$ being circumferentially offset from the slots in disc 124$_a$, and the slots 128$_a$ in disc 120$_a$ being circumferentially offset from the slots in disc 122$_a$.

Figure 5:
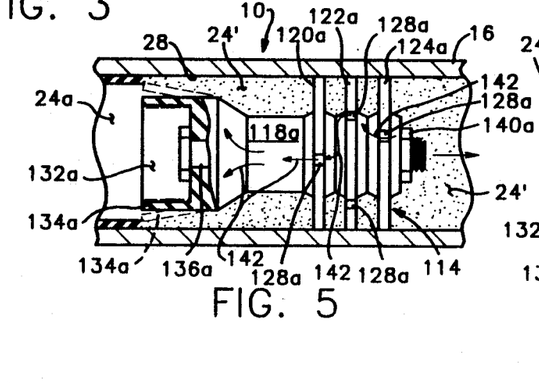
FIGS. 5 and 6, respectively, are enlarged scale, partially sectioned elevational view of the extruder pigs taken along lines 5—5 and 6—6 of FIGS. 3 and 4, and illustrate the extrusion coating action of the pigs within the pipeline.
Figure 6:
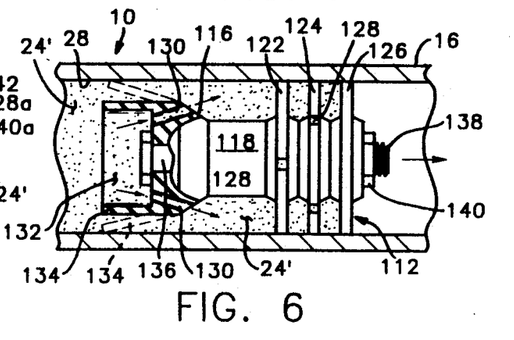

As is best illustrated in FIGS. 5 and 6, the extruder pig discs are diametrically sized to firmly engage the interior pipeline surface 28, while the outer diameters of the cup member wall portions 134 and 134$_a$ (with such wall portions in their solid line, unflexed positions shown in FIGS. 5 and 6) are somewhat smaller than the inner diameter of the pipeline 10.

To apply a first protective coating layer 24$_a$ to the cleaned, etched and dried interior pipeline surface 28, the extruder pigs 112 and 114 are loaded into the upstream pipe section 30 in a spaced relationship in which the fluid inlet ports 34 are positioned between the loaded pigs. A predetermined quantity (at least sufficient to coat the entire interior pipeline surface 28 and fill the corrosion pits therein) of a 100% solid, solvent-free epoxy coating material 24' is then forced through one of the inlet ports 34 into the space between the pigs 112, 114 until such space is filled and the coating material 24′ begins to be discharged from the vent fitting 34, thereby forcing any residual air outwardly from between the pigs.

The 100% solid, solvent-free epoxy coating material 24′ contains a fiberglass reinforcement filler material and a suitable cure-inhibiting agent which importantly provides the material with an extended pot life of from about four to about six hours. Coating material 24′ is commercially available, and is manufactured by International Paint Inc. of Union, N.J. under the product designation "INTERLINE" TH3030H. The coating material 24′ has a high viscosity and is suitable for an extrusion coating process which will now be described.

After the material 24′ has been appropriately loaded between the leading and trailing extruder pigs 112 and 114, dehydrated air is forced into the chambers 46 and 48 through their air inlet fittings 52 to create an air pressure differential across the pigs 112 and 114, with the air pressure upstream of the pigs being greater than the downstream air pressure by a predetermined amount calculated to drive the pigs 112 and 114, and the coating material 24′ therebetween, rightwardly through the pipeline at a predetermined, controllable velocity.

As the pigs 112 and 114 (FIGS. 1, 5 and 6) are air-driven rightwardly through the pipeline, the trailing pig 114 is progressively forced toward the leading pig 112. The differential air pressure force across the pig pair causes the resilient trailing cup member wall portion $134_a$ to flare outwardly toward the inner pipeline surface 28 as indicated by the dotted line position of wall portion $134_a$ in FIG. 5. The leading pig cup member wall portion 134 (FIG. 6) is also caused to flair outwardly to its dotted line position in which it engages and wipes the interior pipeline surface 28. The differential pressure force across the pig pair 112, 114 maintained as the pigs rightwardly traverse the pipeline also forces coating material 24′ rightwardly through the passages 130 and the disc slots 128 of the pig 112 to maintain lubrication for the leading pig.

As the trailing pig 114 is progressively moved toward the leading pig 112, a small portion of the coating material 24′ is forced leftwardly past the annular rear edge of the flared cup wall $134_a$ to extrudingly apply the relatively thin first coating layer $24_a$ to the interior pipeline surface 28. The extrusion pressure exerted on the coating material 24′ pressure-fills the various corrosion pits 26 (FIG. 7) with coating material 24′.

According to a unique aspect of the present invention, the coating material 24′, prior to its extruded application to the interior surface of the pipeline, is continuously mixed by means of the circumferentially offset slots $128_a$ formed in the trailing pig discs $120_a$, $122_a$, and $124_a$. Specifically, as indicated by the arrows 142 in FIG. 5, coating material 24′ to the right of the trailing pig 114 is forced leftwardly through the slots $128_a$ in the disc $124_a$, circumferentially offset and then forced leftwardly through the slots $128_a$ in the center disc $122_a$, and then circumferentially offset again before being forced leftwardly through the slots $128_a$ in the left disc $120_a$. This continuous internal mixing of the coating material 24′ greatly facilitates its extrusion application to the interior pipeline surface by preventing air pocket buildup in the entrained coating material and, in general, keeping it well mixed during its long journey through the pipeline 10.

Both the thickness of the initial coating layer $24_a$ and the velocity of the pigs 112, 114 through the pipeline may be easily regulated simply by selectively altering the dehydrated air pressure differential across the extruding pigs. For example, a greater or lesser pressure differential may be used to control the amount of outward flairing of the cup member wall portion $134_a$ of the trailing pig 114, thereby controlling the thickness of the first coating layer $24_a$.

After the leading and trailing extruder pigs 112 and 114 have been air driven along the entire length of the pipeline 10 into the downstream chamber 48, the pigs and any residual amount of the coating material 24′ are removed, and the first coating layer $24_a$ is dried by forcing dehydrated air through the pipeline for a time (on the order of from about 6 hours to about 24 hours) sufficient to thoroughly cure the coating layer $24_a$.

Importantly, because the coating mixture 24′ is free of solvents, and has a high viscosity, the first coating layer $24_a$ does not tend to "run" and puddle along the bottom of the pipeline. Additionally, because of the absence of solvent, the air drying process may be performed without causing blistering of the coating layer $24_a$. Moreover, because the coating material 24′ is of a 100% solid composition, it may be applied in a wide range of thicknesses without sagging or otherwise being displaced within the pipeline prior to being cured. Further, even though the depth of the corrosion pits 26 (FIG. 7) may be quite deep (i.e., on the order of 0.200″) the subsequent air drying completely cures the coating material 24′ which was previously forced into these pits. There are simply no curing problems (as occur with solvent-type epoxy coating materials) associated with these relatively large masses of coating material received in the corrosion pits.

When the first coating layer $24_a$ has been cured with dehydrated air, the pigs 112 and 114, together with another batch of coating material 24′ therebetween, may be loaded into the downstream pipe section 32 and driven with dehydrated air leftwardly through the pipeline into the upstream chamber 46 to apply a second coating layer $24_b$ (FIG. 8) onto the cured first layer $24_a$. The pigs and any residual coating material are then removed from the upstream chamber 46 and the second coating layer $24_b$ is cured for an appropriate time with dehydrated air. A third coating layer $24_c$ is then applied to the cured second coating layer $24_b$ by driving the extruder pigs 112, 114, together with a third batch of coating material 24′, rightwardly through the pipeline into the downstream chamber 48. The third coating layer $24_c$ is then cured by forcing dehydrated air once again through the pipeline.

The result of this unique multi-layer extrusion coating process is that the resulting coating 24 (FIG. 8) may be formed in a total thickness to define a "pipe within a pipe" which not only protects the pipeline 10 from further interior corrosion, but adds very substantial structural reinforcement thereto. As an example, a total coating thickness of 0.100″ or more may be easily formed using only a few extrusion layers. At the other end of the spectrum, for example in new pipelines to be protectively coated, an interior layer of only 0.015″ may be formed by three coats, each having a thickness of approximately 0.005″.

It can readily be seen that the coating process of the present invention permits corroded pipelines extending many miles to be economically and relatively quickly coated without, in most instances, the necessity of excavating except at the inlet and outlet ends of the pipeline. Of course, if there are major corrosion holes or ruptures in the pipeline, some "spot" excavation would be required.

The unique use of the 100% solid, solvent-free coating material 24', with its extended pot life of from four to six hours, permits even a very lengthy underground pipeline to be coated in one "pig pass" per coating layer. For example, a typical extruder pig velocity through the pipeline is approximately 5 mph. Accordingly, for a twenty five mile pipeline only approximately five hours would be required for each coating layer —a time well within the pot life of the coating material. The illustrated ten mile pipeline 10, at this extruder pig speed, would require only approximately 2 hours of extruder pig travel for each coating layer.

As previously mentioned, another advantage of the present invention is the ability that it provides to substantially shorten the pre-coating cleaning process by permitting one cleaning pig pair to be loaded while another pig pair is being air-driven through the pipeline. This feature, which will now be described, may also be employed in conjunction with spherical pig trains (or trains utilizing pigs of different configurations) as illustrated in FIG. 1.

Figure 9:
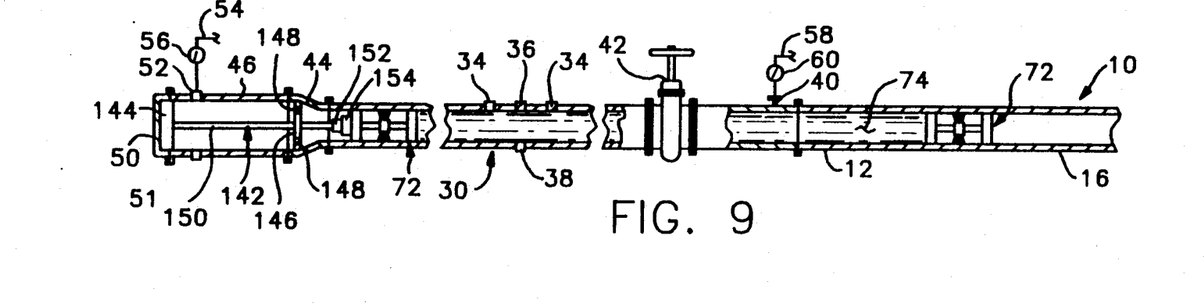
FIGS. 9–11 are schematic cross-sectional views, partially in elevation, of inlet and outlet end sections of the pipeline, and sequentially illustrate a unique method of loading two pairs of the bi-directional brush pigs therein.
Figure 10:
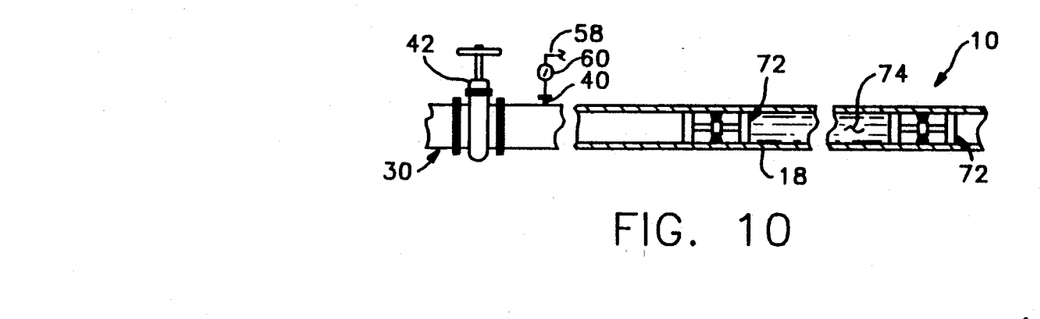
Figure 11:
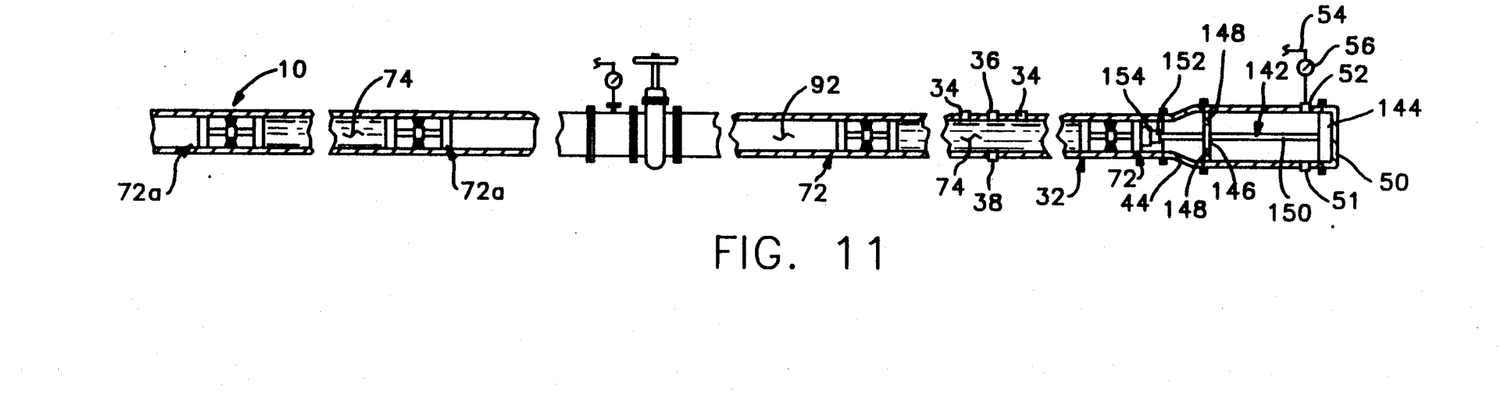

Referring now to FIGS. 9-11, to permit this more rapid and efficient cleaning process, the present invention provides a pair of bumper stop structures 142 adapted to be placed within the upstream and downstream chambers 46 and 48. Each of the bumper stop structures 142 includes a disc-shaped outer end member 144 and a disc-shaped inner end member 146 having a series of air transfer passages 148 formed axially therethrough. Members 144, 146 are coaxially intersecured, in an axially spaced relationship, by a central rod member 150. As illustrated in FIGS. 9 and 11, the bumper stop structures 142 are sized to be inserted axially into the chambers 46 and 48 and retained therein by the end closure members 50. Inserted in this fashion into the chambers 46 and 48, the end members 146 internally abut the pipe transition sections 44, and the outer end members 144 internally abut the end closure members 50. Extending inwardly from each of the inner end members 146 is a length adjustable rod portion 152 having a bumper member 154 secured to its outer end and positioned within the outer end of one of the pipe sections 30, 32.

To load the brush pig pair 72 (FIG. 1) into the pipe section 30, the closure member 50 of the chamber 46 is opened and the first brush pig 72 is rammed into the outer end of the pipe section 30 in a conventional manner. The end member 50 is then closed, and pressurized air is flowed into the chamber 46 to drive the first pig 72 rightwardly a predetermined distance along the pipeline. The closure member 50 is then opened again and then second pig 72 is rammed into the outer end of the pipe section 30. The left bumper stop structure 142 is then operatively inserted into the chamber 46 and the end member 50 is reclosed. The acidizing fluid 74 is then flowed into the space between the two loaded pigs 72 as previously described.

With the left bumper stop structure 142 still in place, and the right bumper structure 142 operatively installed as shown in FIG. 11, air is forced into the chamber 46 through the inlet fitting 52 to drive the pigs 72 rightwardly through the pipeline 10 past the open valve 42 as illustrated in FIG. 10. The pressurized air admitted to the chamber 46 is flowed through the passages 148 in the inner end member 146 of the left bumper stop structure 142 to effect the rightward movement of the pigs 72.

After the pigs 72 have been moved rightwardly past the valve 42, the inward airflow to the chamber 46 is terminated, and the valve 42 is closed. Pressurized air is then flowed inwardly into the pipe section 30, via inlet fitting 40 (FIG. 10) to further drive the brush pigs 72 rightwardly through the pipeline.

While the pigs 72 are being rightwardly driven in this manner, the second set of pigs 72$_a$, and a second batch of the acidizing fluid 74 positioned therebetween, may be loaded into the pipe section 30 by removing the left bumper structure 142 and repeating the loading steps previously described in conjunction with the lead pair of pigs 72. Importantly, the closed valve 42 isolates the pipe section 30 and the chamber 46 from the pressurized air being introduced into pipeline section 30 to the right of the valve.

Accordingly, the process of loading the second pair of pigs 72$_a$ may thus be carried out without waiting for the first set of brush pigs 72 to reach the opposite end of the pipeline. After the second set of pigs 72$_a$ has been loaded, inward air flow through the inlet fitting 40 to the right of valve 42 is terminated, and the valve 42 is opened. The two pig sets, together with the extended volume of compressed air 92 therebetween (FIG. 11) are then air-driven as previously described to the outlet end of the pipeline.

When the two pig sets reach the right end of the pipeline, the lead pig 72 is brought into abutment with the bumper member 154 of the right bumper structure 142 to prevent the pigs 72 and their associated acidizing fluid 74 from entering the right chamber 48. At this point the acidizing fluid 74 between the two pigs 72 is sampled as previously described and, if the fluid is of sufficient strength for another pass, the two pig sets are air driven leftwardly through the pipeline until the leftmost pig 72$_a$ is brought into abutment with the bumper member 154 of the left bumper structure 142.

This back and forth movement of the two pig sets may be repeated until the interior surface of the pipeline is sufficiently clean, or it becomes necessary to replace the two batches of the acidizing fluid 74. It will be appreciated that, if desired, more than two sets of brush pigs could be loaded into the pipeline and sent back and forth therein to very efficiently and rapidly effect the essential pre-coating cleaning process previously described.

The foregoing detailed description is to be clearly understood as being given by way of illustration and example only, the spirit and scope of the present invention being limited solely by the appended claims.

What is claimed is:

1. An in situ method of repairing an extending subsurfaced pipeline having a corroded interior surface and firs and second opposite ends, the method comprising the steps of:

cleaning and treating the interior surface to prepare it for application thereto of a corrosion protective and reinforcing coating;

providing a first quantity of corrosion protective and reinforcing coating material at least sufficient to entirely coat the cleaned interior surface with a first protective and reinforcing layer having a predetermined thickness and to fill corrosion depressions in the interior surface, the protective and reinforcing coating material being a 100% solid, high viscosity, solvent-free epoxy coating material;

providing leading and trailing extruder pig members, the trailing pig members having first and second spaced apart disc portions thereon;

positioning the leading and trailing extruder pig members in a spaced apart relationship in the extended pipeline;

placing the quantity of corrosion protective and reinforcing coating material between the spaced apart leading and trailing extruder pig members;

utilizing pressurized air to propel the spaced apart leading and trailing extruder pig members, and the corrosion protective and reinforcing coating material positioned therebetween, through the pipeline, from the first end thereof to the second end thereof;

causing the coating material between the pigs to alternatively shift between axial and circumferential flow through offset passages in the trailing extruder pig member to mix the coating material, prior to discharge of the coating material past the trailing extruder pig member;

continuously displacing the coating material outwardly past the trailing pig member and onto the interior surface to extrudingly form the first protective and reinforcing layer thereon and fill the corrosion depressions;

flowing dehydrated air through the extended pipeline to cure the first layer of the corrosion protective and reinforcing coating material; and passing the leading and trailing pig members, and at least one additional quantity of the corrosion protective and reinforcing coating material through the pipeline again, to form on the first protective and reinforcing layer at least one additional protective and reinforcing layer defining therewith a multi-layer coating of sufficient thickness to provide a substantial measure of internal structural reinforcement to the extended subsurfaced pipeline through its length.

2. The method of claim 1 wherein:
the step of providing a first quantity of corrosion protective and reinforcing coating material is performed by providing a 100% solid, high viscosity, solvent-free epoxy coating material having a pot life of from about four hours to about six hours and containing a fiber glass reinforcing filler.

3. The method of claim 1 wherein:
the causing step includes using a trailing pig member having a first circumferentially spaces series of radial slots in the first disc portion, and a second circumferentially spaces series of radial slots in the second disc portion, the first series of slots being circumferentially offset relative to the second series of slots.

4. The method of claim 1 wherein:
the passing step is performed to produce a multi-layer coating comprising at least three protective and reinforcing layers in thickness.

5. The method of claim 1 wherein the step of cleaning and treating the interior surface includes:
providing first and second bi-directional brush pig members each having an elongated central support member, a pair of generally disc-shaped members coaxially secured to opposite end portions of the central support member, and a generally disc-shaped wire brush member coaxially secured to a longitudinally central portion of the central support member, positioning the brush pig members in an axially aligned, spaced apart relationship, placing a predetermined quantity of an acid solution between the spaced apart brush pig members, and utilizing pressurized air to drive the spaced apart brush pig members, and the acid solution therebetween, through the extended pipeline from the first end to the second end.

6. The method of claim 1 further comprising the steps of:
respectively securing first and second pipe extension structures to the first and second opposite ends of the extended pipeline, and respectively positioning first and second stop members in the first and second pipe extension structures, and wherein the step of cleaning and treating the interior surface is performed by positioning a plurality of mutually spaced cleaning pig members in the first pipe extension structure, placing surface treatment fluid between each adjacent pair of cleaning pig members, utilizing pressurized air to propel the cleaning pig members through the extended pipeline to the second stop member, and then utilizing pressurized air to propel the cleaning pig members through the extended pipeline from the second stop member to the first stop member to thereby efficiently reuse the surface treatment fluid.

7. The method of claim 1 further comprising the steps of:
respectively securing first and second pipe extension sections to the first and second opposite ends of the extended pipeline, the pipe sections having a loading chamber and sampling port;

positioning removable first and second stop members in the first and second pipe extension sections, the stop members being positioned to engage a cleaning pig member in the pipeline before it enters the loading chamber;

the cleaning and treating step including sending a first set of spaced cleaning pig members and a charge of surface treatment fluid between them, from the first pipe extension section to the second pipe extension section and into engagement with one of the stop members;

selectively sampling the charge of surface treatment fluid to determine if the charge is spent or reusable;

resending the spaced pig members and the selectively sampled charge of surface treatment fluid back through the pipeline if the charge is not spent and removing and replacing the spent charge before resending if the charge is spent; and repeating the sending and selectively sampling steps to continue surface treatment.

8. The method of claim 1 further comprising the steps of:
respectively securing first and second pipe extension sections to the first and second opposite ends of the extended pipeline, the pipe sections having a loading chamber and sampling port;

positioning removable first and second stop members in the first and second pipe extension sections, the stop members being positioned to engage a cleaning pig member;

the cleaning and treating step comprising loading a first set of spaced cleaning pig members and a charge of surface treatment fluid between them and sending the first set of pig members and the charge of fluid towards one opposite end of the pipeline;

loading at least a second step of spaced cleaning pig members, with a second charge of treatment fluid between the second set, behind the first set of pig members while the first set of pig members is being sent toward one of the opposite ends of the extended pipeline;

temporarily relieving driving pressure in the pipeline and introducing the at least a second set of pig members and second charge of surface treatment fluid into the pipeline behind the first set of pig members;

reestablishing driving pressure in the pipe line to send all pig members through the pipeline one or more times;

selectively stopping one set of pig members at the first or second stop members and isolating the set of pig members and charge of treatment fluid in a transition section;

sampling the charge of treatment fluid between the isolated pig members to determine if the charge is spent or reusable;

replacing the surface treatment fluid between isolated pig members if the charge is spent;

reintroducing the isolated set of pig members and charge of surface treatment fluid into the pipeline;

resending the first and at least one second set of pig members and the charges of treatment fluid between the pig members in the reverse direction toward the other end of the pipeline to continue the cleaning process; and repeating the stopping, sampling and resending steps to complete the cleaning of the pipeline.

9. The method of claim 6 further including:

isolating the first and second pipe extension structures from the pipeline by means of respective first and second valve members;

positioning a vent member in each pipe extension structure; and wherein the steps of positioning a plurality of mutually spaced cleaning pig members and placing surface treatment fluid between each adjacent pair of cleaning pig members comprises:

introducing a spaced pair of first and second pig members into the first pipe extension structure, loading a charge of surface treatment fluid and venting air between the first and second pig members to create a first batch of treatment solution;

moving the first and second pig members an the charge of surface treatment fluid between them just into the first end of the pipeline;

introducing a third pig member spaced behind the second pig member into the first pipe extension structure, loading a charge of surface treatment fluid between the second and third pig members and venting to remove air to created a second batch of treatment solution;

applying pressure to move the third pig member just into the first end of the pipeline;

introducing a fourth pig member spaced behind the third pig member into the first pipe extension structure, loading a charge of surface treatment fluid between the third and fourth pig members and venting to remove air to create a third batch of treatment solution;

applying pressure to move the fourth pig member just into the first end of the pipeline; and closing a valve member to isolate the first extension structure from the pipeline and sending the first through fourth pig members and contiguous first, second and third batches of treatment solution one or more times through the pipeline.

10. The method of claim 9 wherein one or more of the pig members are spherical in shape.

11. The method of claim 9 further including one or more additional pig members spaced in succession behind the fourth pig member, loaded with surface treatment fluid between each pig member and the preceding pig member and vented to remove air to create one or more additional contiguous batches of treatment solution separated by the pig members.

12. The method of claim 11 wherein one or more of the pig members are spherical in shape.

13. The method of claim 1 wherein the cleaning and treating step is preceding by the step of using one or more pressure explodable wiper pigs to scrape away loose scale and obstructions, comprising:

sending the wiper pig or pigs through the extended pipeline to clear obstructions and remove loose scale; and increasing the air pressure on the wiper pig or pigs to force the pig or pigs past any obstruction to clear the extended pipeline by causing the wiper pig or pigs to explode at the obstruction.

14. The method of claim 13 wherein the step of using the wiper pigs includes the step of employing progressively harder wipe pigs to increase the probability of removing obstructions, loose scale and remaining quantities of process fluid from the pipeline.

* * * * *